T. Rogers,
Hand Rail Machine,
N° 10,395. Patented Jan. 3, 1854.
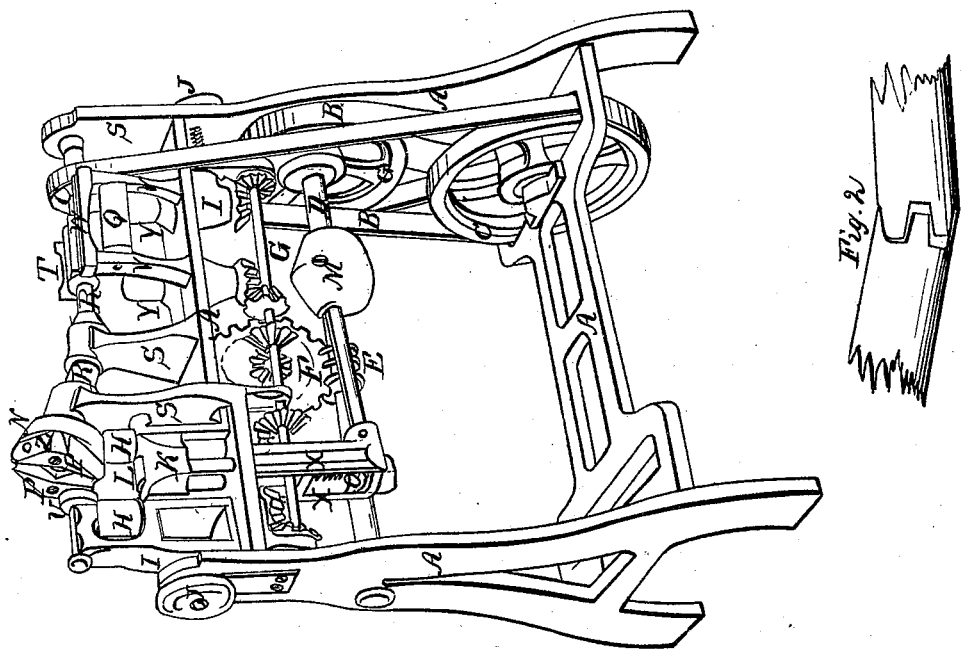

UNITED STATES PATENT OFFICE.

THOMAS ROGERS, OF PHILADELPHIA, PENNSYLVANIA.

MACHINE FOR CUTTING HAND-RAILS.

Specification of Letters Patent No. 10,395, dated January 3, 1854.

*To all whom it may concern:*

Be it known that I, THOMAS ROGERS, of Philadelphia, in the county of Philadelphia and State of Pennsylvania, have invented a new and useful Machine for Molding and Capping of Hand-Rails for Stairs; and I do hereby declare that the following is a full, clear, and exact description of the construction and operation of the same, reference being had to the annexed drawings, making a part of this specification, in which—

A A A A represent a frame; B B, boards; C C, two pulleys on lower or driving shaft that gives motion to shaft D and R R; E, a worm or screw that gives motion to wheel F on which a bevel pinion is connected that gives motion to shaft G, which gives motion to rollers H H and Y Y with other bevel pinions, the one on each end of the shaft being loose, sliding on a feather or square shaft, being connected by a collar to slide I I, which supports rollers H H and Y Y; J J, two hand wheels with screws and springs to move the slides in the slot so as different thicknesses of railing may pass between the rollers; K, a pillow block on which roller L rests. This block is supported by counterbalance M which keeps the rail up to the cutter head N; O, a screw to raise or lower to allow of different widths of rail to be molded; N, cutter head being in three separate parts and fastened together with bolts or screws, the parts that the cutters are fastened to having a little play so as to admit of them turning on the screws P P so as to admit of them operating in either direction; Q, a roller to keep the rail from rising too much against the cutter; R R, cutter shaft or mandrel of which one part runs on an inclined position to prevent the cutters from injuring the upper part of the side of the rail, particularly the circle or twisted parts; S S S, pedestals to support shaft R R.

Figure 2 is a joint of shaft in pedestals; T, cutters on shaft R R to cap or round the upper side of the railing; U, a roller to keep the rail from rising up too much against the cutters; V V, supports to roller Q; W, a spring to admit of the roller to rise in case of variation of thickness.

To use the above described machine the rail being squared place the end of the rail between the roller, H H, then run the machine in the right direction to draw the rail through. Cutters N will then mold one side. Then place it the other side up. It will then mold the other side. That finishes the molding part. To cap the upper side place the rail between rollers Y Y, the machine being run in the same direction. Cutters T will cap the said rail, which completes it. What is called molding is the shaping of the two perpendicular sides of the rail, and capping is the rounding of the upper side of the said rail. The cutters will regulate themselves—that is, those that run backward pressing against the stuff will throw those that run forward out so that they will cut. By reversing the motion the cutters will move so as to cut in that direction. The object of this arrangement is where the stuff is cross grained it can be run in either direction to cut smooth in the molding.

I wish it understood I don't claim pulleys, bands, worm wheels, or pinions, being aware they have been used before in machinery, but I do claim as new and of my invention and desire to secure by Letters Patent—

The combination of the self-adjustable cutters (reversible in motion, as described) with the jointed shaft and devices for driving the same, in the manner and for the purpose hereinbefore set forth.

THOMAS ROGERS.

Witnesses:
GEORGE M. CLOOK,
JOHN ROGERS.